United States Patent [19]
Smith et al.

[11] 3,795,142
[45] Mar. 5, 1974

[54] TEMPERATURE WELL LOGGING

[75] Inventors: Robert C. Smith, Inola; Roger J. Steffensen, Tulsa, both of Okla.

[73] Assignee: Amoco Production Company, Tulsa, Okla.

[22] Filed: June 27, 1972

[21] Appl. No.: 266,770

[52] U.S. Cl. .................................................. 73/154
[51] Int. Cl. ............................................ E21b 47/06
[58] Field of Search ........................................ 73/154

[56] References Cited
UNITED STATES PATENTS

3,709,032   1/1973   Coles, Jr. et al. ....................... 73/154

Primary Examiner—Jerry W. Myracle
Attorney, Agent, or Firm—Paul F. Hawley; John D. Gassett

[57] ABSTRACT

This concerns a method of determining vertical locations of intervals receiving injection of a fluid in an injection or production well drilled through a subsurface formation. Fluid, having a bottomhole temperature at least about 5° different from the fluid normally injected or produced through the well, is injected for a period of time, e.g., about 3 – 6, or occasionally 24 hours. As soon as injection is stopped, a series of time-spaced temperature logs are run in the well bore; preferably at intervals of not over 30 minutes. Temperature anomalies appearing in the logs indicate the injection zone or zones.

2 Claims, 1 Drawing Figure

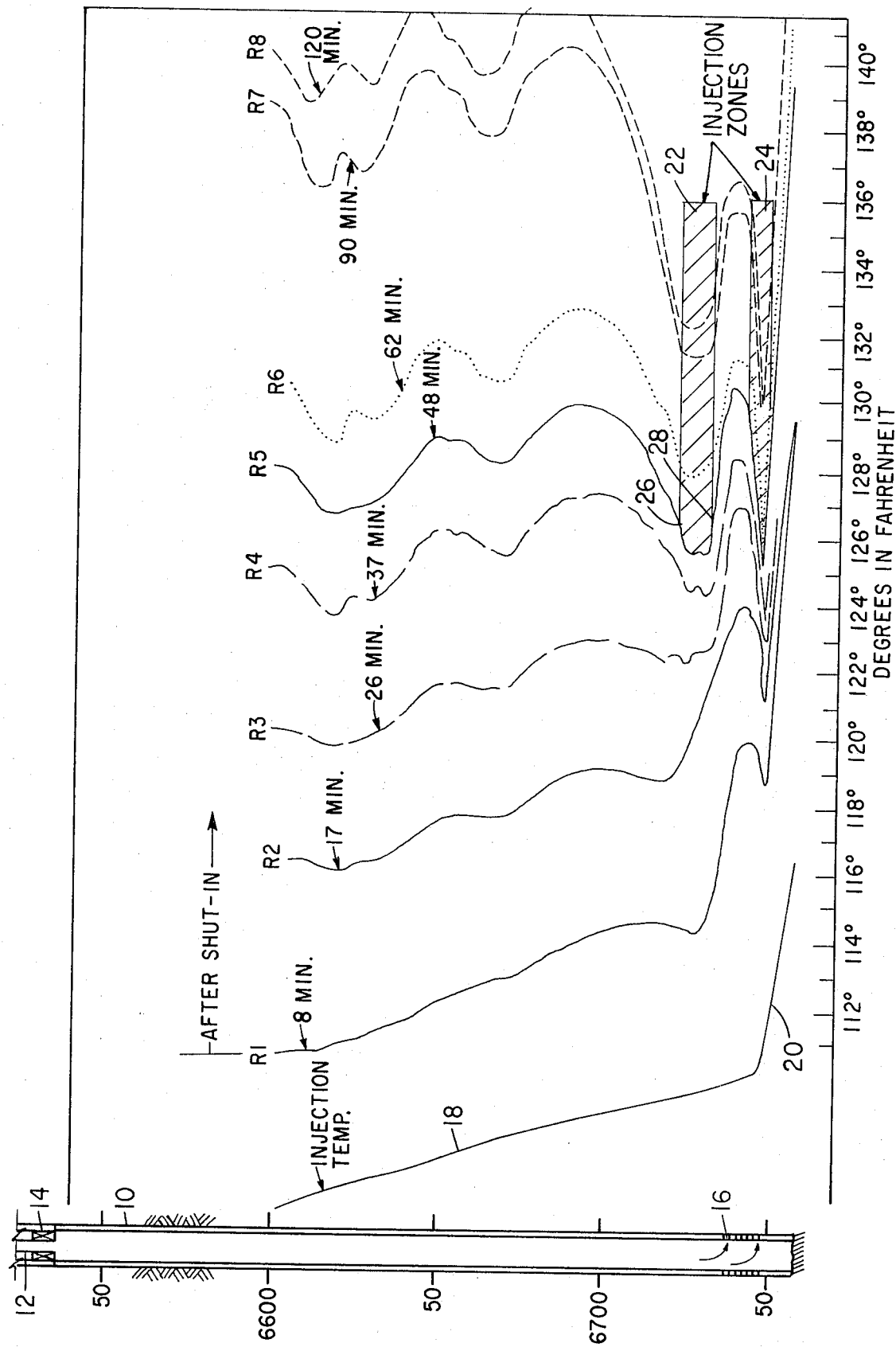

TEMPERATURE WELL LOGGING

BACKGROUND OF THE INVENTION

1. Field of the Invention

This invention relates to a logging method to determine the vertical location of permeable zones in an underground formation penetrated by a well bore. It relates to a special procedure for using temperature logs.

2. Setting of the Invention

Wells are drilled into or through underground formations which contain oil. Considerable research and development has been conducted toward finding techniques for determining and locating permeable zones in both injection and producing wells. It is through these permeable zones that the injected fluid or produced fluid flows. Many wells are drilled into formations which have multiple permeable zones which are separated by layers of impermeable formation such as shale some of which are only a few feet thick. Various techniques have been suggested and used in an effort to locate exactly the position of such permeable zones. Some of these techniques include the injection of tracer elements, flow meter measurements of fluid flow at various depths in the borehole, and temperature surveys. These methods all have their weaknesses. Many injections are through perforations in casing set in the well bore and these methods thus mentioned cannot determine where the injected fluid may flow after it has moved a few feet from the well bore. For example, it is possible there are vertical channels between the casing and the well bore wall. In such cases, radioactive tracers would indicate on the log that there was injection all along the vertical dimension of the channel. The elevation on the log corresponding to a bed of shale would look the same as that corresponding to permeable zones. The flow meter surveys would indicate only where the fluid leaves the well bore and in the case of a cased well, it would merely determine the elevations of perforations which are probably already known. There have been several temperature survey techniques suggested in the prior art. These methods utilize various extrapolated temperatures or arbitrarily chosen portions of measured temperature curves to aid in interpretation. Various articles have been written on temperature survey systems. These include: Nowak, T. J.: "The Estimation of Water Injection Profiles from Temperature Surveys," Trans. AIME (1953) 193, 203–211; Bird, James M.: "Interpretation of Temperature Logs in Water-and Gas-Injection Wells and Gas-Producing Wells," Drill. and Prod. Pract. (1954); Romero-Juarez, Antonio: "A Note on the Theory of Temperature Logging," SPE Jour. (Dec. 1969) 375-377; Ramey, H. J.: "Wellbore Heat Transmission," Jour. Pet. Tech. (April 1962) 427–435; Kading, Horace: "Shut-In Temperature Profilses Tell Where the Water Went," Oil and Gas Jour. (May 13, 1968) 77–79; and Hutchins, J. S., and Kading, Horace: "How to Interpret Temperature Surveys-1 and 2," Oil and Gas Jour. (Aug. 11 and Aug. 25, 1969).

We have conceived and conducted logging operations in the field of an improved injection profiling technique using temperature logs.

BRIEF SUMMARY OF THE INVENTION

This invention concerns a method of determining the location of vertical intervals having fluid flow therethrough in an underground formation penetrated by a well bore. We inject a fluid, preferably water, at a bottomhole injection temperature at least about 5° F and preferably about 10° F or more different from the fluid normally injected or produced through the well. The fluid will naturally be injected into the more permeable zones. The temperature in these permeable zones will be influenced by the temperature of the injected fluid. After shut-in, the temperatures in these zones will influence the temperatures at the various corresponding levels in the well bore. Immediately following the stopping of injection, we run a temperature survey through the well bore at closely time-spaced intervals, e.g., 10–30 minutes. Temperature anomalies appearing in these temperature logs indicate the zone or zones having fluid flow therethrough.

BRIEF DESCRIPTION OF THE DRAWING

A better understanding of the invention will be had from the following description taken in conjunction with the drawing which illustrates the lower end of a well bore and a series of time-spaced temperature logs having anomalies indicating injection zones.

DETAILED DESCRIPTION OF THE INVENTION

Attention is first directed to the drawing which shows a well bore with casing 10 set therein. Only the lower end of the casing from about 6540 to 6760 feet is shown. A tubing string 12 is suspended in the casing 10 and terminates at about 6540 feet. At this point, a packer 14 seals the annulus between the tubing string and the casing. The lower end of casing 10 has perforations 16 from about 6738 to 6750 feet. The well which we are discussing was drilled in the Black Slough field in Burke County, North Dakota. This was an oil producing well with water production problems and had a temperature of about 180° F at the producing zone. Production was through perforations 16. The operating personnel wished to identify the vertical intervals which were producing water. It is believed that a description of how the water zones were determined using the method of our invention in this well will be most helpful in the explanation of our invention. Previous to our temperature survey, various attempts had been made to determine the zones from which the water was coming. A radioactive tracer survey was conducted which in simplified form was merely placing a tracer in a carrier fluid and injecting it in the perforations 16 and then running a radioactive log in the well bore. This showed that water went through the pipe and the well bore but the direction of the water was lost at about 6724 feet. This was not adequate.

When we practiced our invention on this South Black Slough Well, instead of using hot water injection, it was more practical to inject a water much colder than the bottomhole formation. This was due to the fact that the initial bottomhole temperature was high (about 180° F). We were able to cool the water to 50°– 60° in a large tank at the surface. We then injected 465 barrels of this cold water in 14 hours. We did not run an injection temperature survey in the well bore during injection, but if we had, the curve would have been similar to simulated curve 18 in the drawing. It will be noted that although the water was 50° – 60° F at the surface, in flowing down through casing 10 it was warmed to over 100° by the time it reached 6600 feet. A key consideration was that it was still several degrees cooler than the formation temperature. The more or less dead water space below about 6748 feet warms rather rapidly and is responsible for the sharp increase in temperature at portion 20 of curve 18.

As soon as the injection was stopped, we started running a series of time-spaced logs identified as R1 through R8 on the drawing at the intervals in time indicated. These are reproductions of the actual temperature logs made from surveys run in the well bore of the South Black Slough Well. The temperature of the fluid in the well bore is influenced most largely by the temperature of the formation in a radial direction. The permeable zones received the colder water, were cooled by it, and stayed colder until vertical conduction of heat through the impermeable zones equalized them after injection was stopped. This equalization was slow enough that when we took a series of time-spacd curves, the injection zones appeared as "cooler" temperature anomalies on the logs; i.e., the two portions of the logs considerably below the temperature of the adjacent portions. These anomalies start showing up rather sharply on logs R5, R6, R7 and R8. These two areas have been shaded in on the drawing to indicate upper injection zone 22 and lower injection zone 24. Zone 22 is from about 6724 to 6732 feet and zone 24 is from 6748 to 6750 feet. These temperature anomalies in our time-spaced temperature logs clearly show that the fluid, mostly water, in this well was produced through zones 22 and 24 at these intervals. Thus, with our method we determined the zones having water flow.

We can use our temperature surveying method in either a production well or an injection well to identify permeable zones. The temperature anomalies will be similar in either type well if similar injection procedures are used prior to the survey. The location of permeable zones is most important to the petroleum engineer who may be planning secondary recovery operations utilizing this well or to determine where water may be produced in the case of a producing well producing an excessive amount of water.

The above description in connection with the drawing describes a preferred manner of operating our logging technique. There are several considerations to be made in the use of our invention. These include stabilization [which means stabilization of the temperature and pressure distributions within the formation (near the well) prior touse of our invention], temperature of the injected fluid, the rate of injection, the duration of the injection, and the times at which the temperature surveys are run. Various considerations of each of these points will now be discussed.

STABILIZATION OF THE FORMATION

We prefer to obtain a temperature background which is not changing significantly with time so that temperature anomalies due to injection of hot or cold fluid are easier to identify. If we have been producing the well, in which the logs are to be run, for a period of time at a uniform rate or if the well is an injection well and the temperature of the injection water and the rate have been uniform over at least one or two days, then we need to take no special steps to obtain stabilization because stabilization for our purposes is already attained. If we do not know that the formation is stabilized, we, as a safety precaution, for an injection well, will inject fluid at a uniform rate and temperature for at least 24 hours just prior to using our technique. For a producing well, we will obtain several hours of steady production. The rate should be steady and suitable for obtaining stabilization. Usually, the most suitable rate is the average rate used in recent days.

TEMPERATURE

After we have taken precautions to insure that the formation near the well bore has a stabilized temperature distribution, we inject a fluid, preferably water, having a temperature at the point of injection into the formation at the bottom of the well bore which is at least about 5° F and preferably 10° F different from the fluid previously injected or produced. The rate at which the fluid is injected and the earth temperature along the well bore will largely determine how much heat the injected fluid loses or gains as it flows down the well bore. The difference in temperature must be such so that detectable anomalies can be found in the well bore temperature logs.

RATE OF INJECTION

The rate of injection must be high enough so that the water injected at the surface will remain either warm enough or cool enough to increase or decrease the bottomhole temperature by at least approximately 5° F and preferably 10° F or more. The minimum rate to accomplish this is not always easily predetermined. Therefore, the higher the injection rate the better. The minimum rate depends upon several factors such as depth, geothermal gradient, well bore configurations, and temperature of previous injection fluids, if any. The bottomhole temperature can easily be measured during injection to determine if the required temperature differential has actually been obtained during injection. The rate should be sufficient to obtain lateral injection of the injected fluid through the permeable zones before the vertical transfer of heat equalizes the temperature in the permeable and non-permeable zones.

TIME OF INJECTION

The duration of the injection of the hotter or colder fluid should be as short as possible, e.g., a few hours but will of course depend upon the injection rate to some extent. Ordinarily, we prefer that the injection of the hotter or colder fluid be completed in 3 – 6 hours and usually not over 24 hours at the longest. Of course, the thickness of the non-permeable zone between the two permeable zones will have an effect on the total length of time we can use. However, this thickness is not known or there would be no need for this survey. Therefore, we keep the time short so that sharp differentials in temperature will show up in anomalies as indicated for example in the drawing in curve R5 between points 26 and 28. These are well defined anomalies.

NUMBER OF AND TIME OF TAKING TEMPERATURE SURVEYS AFTER INJECTIONS

There should be enough time-spaced temperature surveys run so that any anomaly of temperature will clearly show up. In the example given in the drawing, we ran eight temperature surveys in the first 2 hours after the well was shut-in following injection. A definite pattern of temperature anomalies showing cooling effects started occuring with log R4 taken 37 minutes after shut-in. The additional logs R5, R6, R7 and R8 clearly show this anomaly which we have designated as injection zone 22 and injection zone 24. We have found that we ordinarily need at least 3 temperature surveys in the first 2 hours to get an indication of the location of temperature anomalies. We prefer we have more so that the pattern of the anomalies is more clearly defined. In some cases, temperature surveys at longer shut-in times, such as 4, 6, 12, or even 24 hours may aid and/or confirm the interpretation of results.

The injection fluid can be any fluid capable of being injected at the desired temperature. However, we would ordinarily prefer to inject water, as it is a good carrier of heat and is usually readily available and can be treated if necessary to prevent damage to the formation.

Another modification of our logging sytem, which has limited application, is what we refer to as a double shut-in technique. This is applicable to a water injection well in which the temperature at a given depth of water normally injected is different from the "natural" formation temperature. In this method, we stop injecting and let water stand in the tubing or casing through which it was being injected. This first shut-in period will usually have to be at least one or two days. Longer shut-in periods would be better but ordinarily are not essential. During the first shut-in period, wellbore temperatures at or near injection zones will change by a few degrees, e.g., 2° to 4° or more. In contrast, temperatures of the wellbore and the water in the tubing above the injection zones will change more during this first shut-in period. When injection is resumed, the injection water temperature at injection zone depth will differ from the formation temperature which is what is essential to the practice of our invention. As soon as we inject sufficient water from the wellbore into the formation (by additional surface injection), we shut-in the well for the second time. We would ordinarily prefer to inject into the formation only sufficient water to cause a temperature anomaly which will persist for at least a few hours and thus be reliably measurable. In some cases, the only water which will be caused to enter the formation will be that which has been heated due to standing in the wellbore. Such injection can be accomplished by additional surface injection of any temperature. In other cases, however, it may be desirable to use the double shut-in technique followed by hot water injection. Immediately following the second shut-in, we run our temperature surveys at selected short-time intervals as described above.

The above invention has been described in detail, however, various modifications can be made thereto without departing from the spirit or scope of the invention.

We claim:

1. A method of locating vertical intervals having fluid flow through an underground formation penetrated by a well bore used as a water injection well which comprises:
   a. injecting water into said formation, such water having a temperature at the depth in the well bore at the vertical interval of interest which is different from the formation temperature;
   b. thereafter interrupting said injection of water in step a) by shutting in said well for a period of time sufficient that the temperature of said water within the well bore is changed appreciably;
   c. applying pressure in the well bore to inject at least part of the water having a changed temperature from the well bore into said underground formation;
   d. again shutting in said well, and then
   e. running a series of time-spaced temperature logs in the well bore over the section of interest whereby temperature anomalies appearing in the logs will indicate the zones having fluid flow therethrough.

2. A method as defined in claim 1 in which in step a) the water injected is cooler than the temperature of the formation at the vertical interval of interest and in which step c) includes injecting water into the well at the surface at a temperature as least as hot as that attained by the water in the well during step c).

* * * * *